United States Patent
Lee (10) Patent No.: US 10,930,957 B2
(45) Date of Patent: Feb. 23, 2021

(54) METHOD FOR DETERMINING HUMIDITY CONDITION IN FUEL CELL SYSTEM

(71) Applicants: Hyundai Motor Company, Seoul (KR); Kia Motors Corporation, Seoul (KR)

(72) Inventor: Hyun Jae Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 174 days.

(21) Appl. No.: 16/198,294

(22) Filed: Nov. 21, 2018

(65) Prior Publication Data

US 2020/0106115 A1  Apr. 2, 2020

(30) Foreign Application Priority Data

Oct. 1, 2018  (KR) .................. 10-2018-0117089

(51) Int. Cl.
*H01M 8/04828* (2016.01)
*H01M 8/04492* (2016.01)

(52) U.S. Cl.
CPC ... *H01M 8/04843* (2013.01); *H01M 8/04514* (2013.01); *H01M 8/04522* (2013.01); *H01M 2250/20* (2013.01)

(58) Field of Classification Search
None
See application file for complete search history.

(56) References Cited

U.S. PATENT DOCUMENTS 8,470,479 B2   6/2013  Becker et al.
2012/0148927 A1*  6/2012  Jeon, II ............ H01M 8/04843
                                                         429/414

FOREIGN PATENT DOCUMENTS

KR   10-2013-0037694 A    4/2013

* cited by examiner

*Primary Examiner* — Daniel S Gatewood
(74) *Attorney, Agent, or Firm* — Mintz Levin Cohn Ferris Glovsky and Popeo, P.C.; Peter F. Corless (57) ABSTRACT

A method for determining a humidity condition in a fuel cell system includes steps of: detecting an amount of water in a container that receives water discharged from a fuel cell stack, and determining a humidity condition in the fuel cell stack, based on the amount of water detected. As a result, the actual humidity condition in the fuel cell stack may be accurately determined even when humidification performance is degraded over operating time of the fuel cell system.

16 Claims, 6 Drawing Sheets

METHOD FOR DETERMINING HUMIDITY CONDITION IN FUEL CELL SYSTEM

CROSS-REFERENCE TO RELATED APPLICATION

This application claims under 35 U.S.C. § 119(a) the benefit of Korean Patent Application No. 10-2018-0117089, filed in the Korean Intellectual Property Office on Oct. 1, 2018, the entire contents of which are incorporated herein by reference.

BACKGROUND

(a) Technical Field

The present disclosure relates to a method for determining a humidity condition in a fuel cell system, more particularly, a method for determining a humidity condition in a fuel cell stack, based on an amount of water discharged from the fuel cell stack.

(b) Description of the Related Art

Fuel cell systems, which produce electrical energy through an electro-chemical reaction of fuel continuously supplied thereto, have been developed for use as an alternative power source in various applications including vehicles.

Fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and a direct methanol fuel cell (DMFC) according to the types of electrolytes used. The fuel cell systems may be employed in various applications, such as mobile power supply, transportation, distributed power generation, and the like, according to operating temperatures and output ranges along with the types of fuels used.

Among the fuel cells mentioned above, the PEMFC is applied to a hydrogen vehicle (a hydrogen fueled cell vehicle) that is being developed to replace an internal combustion engine.

A hydrogen vehicle is driven by producing electricity through an electro-chemical reaction of hydrogen and oxygen and operating a motor with the electricity produced. The hydrogen vehicle has a structure that includes a hydrogen tank ($H_2$ tank) for storing hydrogen ($H_2$), a fuel cell stack (FC stack) for producing electricity through oxidation/reduction reactions of hydrogen ($H_2$) and oxygen ($O_2$), various devices for draining water produced, a battery for storing the electricity produced by the fuel cell stack, a controller for converting and controlling the electricity produced, a motor for generating a driving force, and the like.

The fuel cell stack refers to a fuel cell body having tens or hundreds of cells stacked one above another in series. The fuel cell stack has a structure in which a plurality of cells are stacked between end plates, each cell including an electrolyte membrane that divides the interior of the cell into two parts, an anode on one side of the electrolyte membrane, and a cathode on the other side thereof.

A separator is disposed between the cells to restrict flow paths of hydrogen and oxygen. The separator is made of a conductor to move electrons during oxidation/reduction reactions.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water, and the water produced is discharged to the outside.

The PEMFC may maintain power generation efficiency only if an appropriate moisture content is maintained by supplying a predetermined amount of moisture to a polymer electrolyte membrane of a membrane-electrode assembly (MEA).

A fuel cell system may include a humidifier to humidify an intake gas that flows into a fuel cell stack. Further, it is necessary to adjust an air supply into the fuel cell stack and the operating temperature of the fuel cell stack to adjust the humidity in the fuel cell stack.

The actual humidity condition in the fuel cell stack must be accurately determined to maintain an appropriate humidity such that the fuel cell system optimally operates.

However, in the related art, a change in characteristics of the fuel cell system, such as degradation in the humidification performance of the humidifier, due to continual operation of the fuel cell system is not reflected, and therefore it is difficult to accurately determine the actual humidity condition in the fuel cell stack.

SUMMARY

An aspect of the present disclosure provides a method for accurately determining an actual humidity condition in a fuel cell stack despite a change in characteristics of a fuel cell system.

Another aspect of the present disclosure provides a method for determining a humidity condition in a fuel cell system by using data obtained by a device commonly included in the fuel cell system.

According to an aspect of the present disclosure, a method for determining a humidity condition in a fuel cell system includes detecting, by a water level sensor, an amount of water in a container that receives water discharged from a fuel cell stack, and determining, by a controller, a humidity condition in the fuel cell stack, based on the amount of water detected.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. It should be understood that even if shown in different drawings, identical elements are provided with identical reference numerals in the drawings. Further, in describing the embodiments of the present disclosure, detailed descriptions related to well-known functions or configurations will be omitted when they may make subject matters of the present disclosure unnecessarily obscure.

Figure 1:
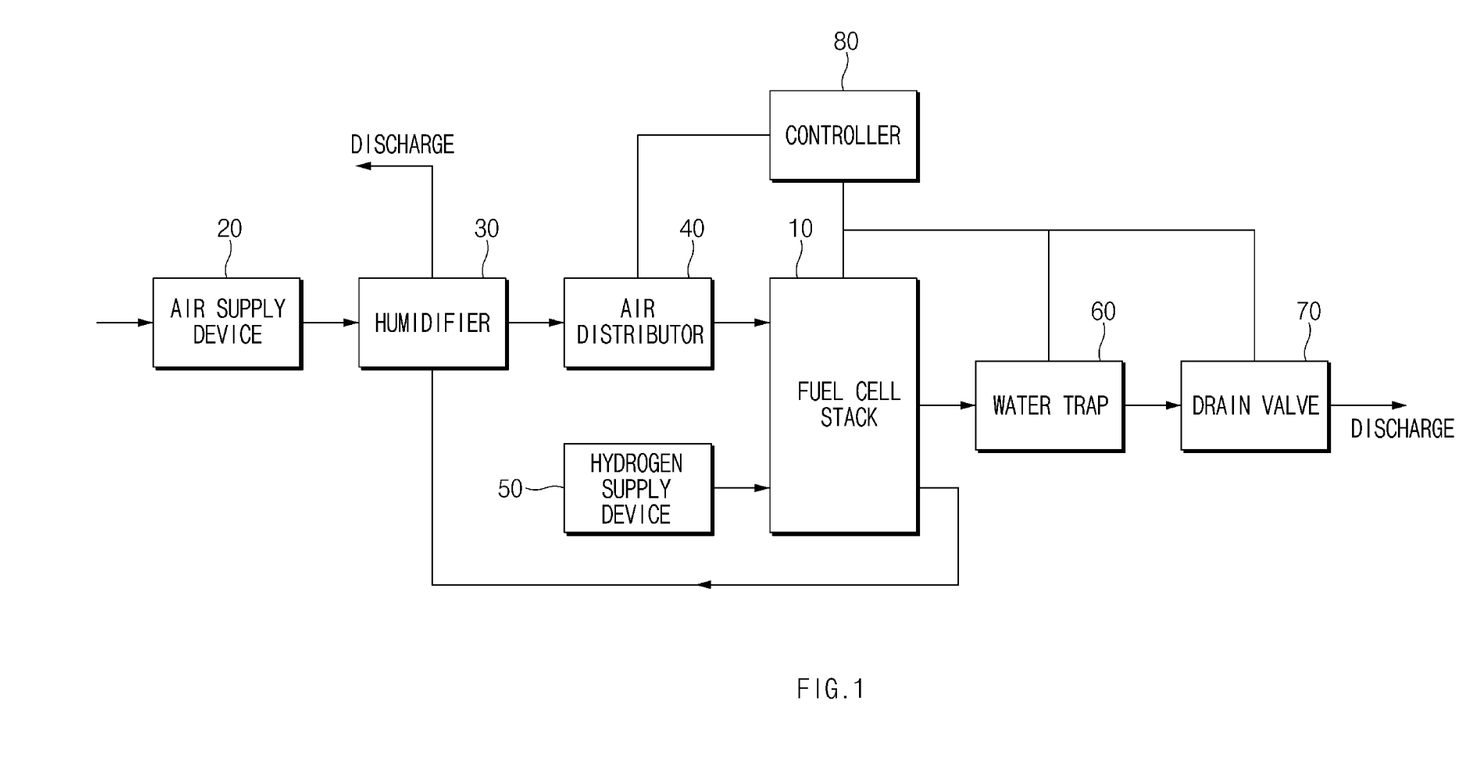
FIG. 1 is a block diagram illustrating a fuel cell system according to an embodiment of the present disclosure.
Figure 2:
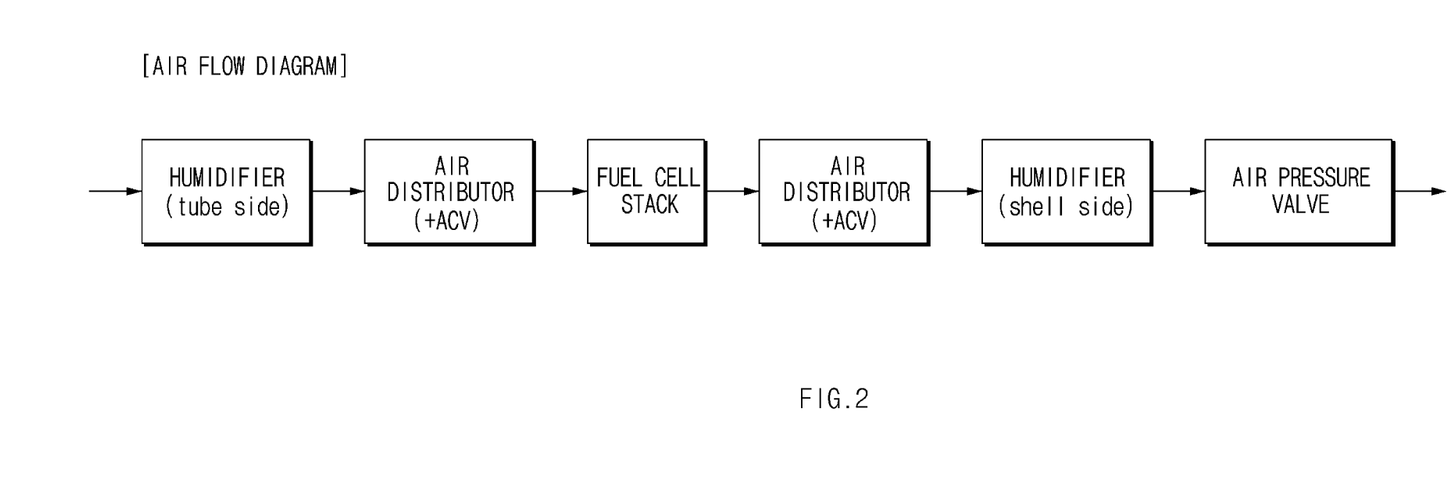
FIG. 2 is a block diagram illustrating an air flow in the fuel cell system of FIG. 1.

FIG. 1 is a block diagram illustrating a fuel cell system according to an embodiment of the present disclosure, and FIG. 2 is a block diagram illustrating an air flow in the fuel cell system of FIG. 1.

The fuel cell system according to the embodiment of the present disclosure may include a fuel cell stack 10, an air supply device 20, a humidifier 30, an air distributor 40, a hydrogen supply device 50, a water trap 60, a drain valve 70, a controller 80, and memory.

The fuel cell stack 10 may have a plurality of fuel cells stacked one above another, each of which includes an electrolyte membrane and a pair of electrodes (e.g., an anode and a cathode) disposed on opposite sides of the electrolyte membrane. The fuel cell stack 10 may produce electricity through an electro-chemical reaction of hydrogen and oxygen.

While the fuel cell system is operating, air including oxygen may be supplied to the cathodes of the fuel cell stack 10, and hydrogen may be supplied to the anodes of the fuel cell stack 10. At this time, the air and the hydrogen may be heated to a high temperature appropriate for a reaction and then supplied into the fuel cell stack 10. In addition, the air may be humidified and then supplied into the fuel cell stack 10 to maintain the fuel cell stack 10 at a predetermined humidity or higher for an electro-chemical reaction.

The humidified air may move along a flow passage in the fuel cell stack 10 and may react with the hydrogen to produce water. The hydrogen supplied into the fuel cell stack 10 may react with the oxygen, and residual hydrogen that does not undergo the reaction may be discharged toward outlet ends of the anodes. The residual hydrogen may be discharged with moisture.

Meanwhile, the water produced and remaining in the fuel cell stack 10 needs to be removed since the remaining water hinders the flow of the oxygen and hydrogen. However, part of the produced water may be discharged outside the fuel cell stack 10 by the flow of the hydrogen or the air, whereas the rest may remain in the fuel cell stack 10 without being discharged. Especially, in the case where a large amount of water exists on the anodes of the fuel cell stack 10, the water may hinder the supply of the hydrogen fuel to degrade the power generation performance of the fuel cell stack 10 and may cause damage to components of the fuel cell stack 10.

A method of increasing the flow speed of fluid (gas mixture containing moisture) in the fuel cell stack 10 by increasing the flow rate of the fluid in the fuel cell stack 10 may be used to discharge the water in the fuel cell stack 10. The most frequently used method may be periodic hydrogen purging. To remove moisture in the fuel cell stack 10, the flow rate of the hydrogen in the fuel cell stack 10 may be increased by performing purging through a drain-purge valve (not illustrated).

In the related art, a relative humidity (HR) estimator is used to determine the humidity condition in a fuel cell stack. The relative humidity estimator estimates the relative humidity in the fuel cell stack by applying temperatures, pressures, or air flow rates for respective locations in a fuel cell system to a simulation model.

However, the relative humidity estimator in the related art may be less accurate in diagnosing the actual dry or wetting condition in the fuel cell stack by reflecting the humidification performance of the fuel cell system that varies with driving time.

The present disclosure relates to a method for more accurately determining the humidity condition in the fuel cell stack by reflecting a change in humidification performance according to driving time. More specifically, the method according to present disclosure includes steps of: detecting the amount of water discharged from the fuel cell stack, and determining the humidity condition in the fuel cell stack, based on the amount of water detected.

The components of the fuel cell system will be described, prior to a description of the method for determining the humidity condition in the fuel cell system according to the present disclosure.

The air supply device 20 may be a type of air blower that supplies air to the fuel cell stack 10. The air supply device 20 may operate at a reference revolution per minute (RPM) under the control of the controller 80 to supply (compress) air to the fuel cell stack 10 for a reference period of time. In this case, the reference RPM may be set to apply pressure by which, when the sealed state of the air distributor 40 is defective, that is, when a gasket in the air distributor 40 is damaged (torn), air is supplied into the fuel cell stack 10 through the damaged portion even though the air distributor 40 is completely closed. It is apparent that air is not supplied into the fuel cell stack 10 at the reference RPM when the sealed state of the air distributor 40 is normal.

The humidifier 30 may humidify a supply gas that is supplied into the fuel cell stack 10. The supply gas, which is supplied into the fuel cell stack 10, and an exhaust gas discharged from the fuel cell stack 10 and having moisture content greater than that of the supply gas may flow through the humidifier 30.

The humidifier 30 may have a supply gas passage and an exhaust gas passage therein. The supply gas may flow through the supply gas passage, and the exhaust gas may flow through the exhaust gas passage.

For example, the supply gas passage may be formed in a hollow fiber membrane, and the exhaust gas passage may be formed in the inner space of the humidifier 30 in which the hollow fiber membrane is installed. Moisture may be transferred from the exhaust gas to the supply gas through the hollow fiber membrane.

The air distributor 40 may be an apparatus for adjusting an air supply required for a reaction with hydrogen in the fuel cell stack 10. For example, the air distributor 40 may include a housing with an air passage for an air flow, a flap valve for opening or closing the air passage of the housing by using a flap body, and a solenoid valve for controlling the opening or closing of the flap valve.

The air distributor 40 may include an air cut-off valve (ACV).

The ACV may operate in such a manner that a flap valve is switched to Full Close at key-off of a vehicle and Full Open at key-on of the vehicle. In this case, the vehicle may be started normally and then driven only if the output voltage of the fuel cell stack 10 does not exceed a threshold value, with the ACV in a completely closed state (a state in which the supply of air into the fuel cell stack 10 is cut off).

The air distributor 40 may have a bypass passage. That is, the air distributor 40 may have an air passage for directly discharging air without supplying the air into the fuel cell stack 10.

The air distributor 40 may adjust the angle of the flap valve in the ACV (adjust an air supply), based on a control signal from the controller 80. That is, the air distributor 40 may adjust an air supply into the fuel cell stack 10, by adjusting the angle of the flap valve in the ACV.

Referring to FIG. 2, in the fuel cell system, air may be introduced into the humidifier 30 from the air supply device 20 and may be supplied into the fuel cell stack 10 through the air distributor 40. The air discharged from the fuel cell stack 10 may be introduced again into the humidifier 30 through the air distributor 40 and may be discharged outside the fuel cell system through an air pressure valve.

The hydrogen supply device 50 may supply hydrogen into the fuel cell stack 10. The hydrogen supply device 50 may include a hydrogen tank for storing hydrogen, a supply tube through which the hydrogen flows from the hydrogen tank into the fuel cell stack 10, a valve for opening or closing the supply tube, and a solenoid valve for controlling the opening or closing of the valve.

The water trap 60 may receive water discharged from the fuel cell stack 10. The water trap 60 may receive water discharged from the anodes or the cathodes of the fuel cell stack 10.

Water discharged outside the fuel cell stack 10 by a gas flow in the fuel cell stack 10 may be introduced into and received in the water trap 60. For example, water discharged outside the fuel cell stack 10 by hydrogen purging may also be introduced into and received in the water trap 60.

The water trap 60 may have a water level sensor (not illustrated) installed therein for detecting the amount of water in the water trap 60.

The water level sensor may be a sensor for detecting whether the water in the water trap 60 reaches a predetermined water level. In this case, the water level sensor may detect that the water in the water trap 60 reaches the predetermined water level and may provide a signal to the controller 80, based on the detection. The controller 80, when receiving the signal, may open the drain valve 70 to discharge the water in the water trap 60 to the outside.

Alternatively, the water level sensor may be a sensor for detecting the amount of water in the water trap 60 in real time.

The drain valve 70 may be controlled by the controller 80 so as to be opened to discharge the water in the water trap 60 to the outside when the water in the water trap 60 reaches the predetermined water level.

The controller 80 may control the overall configuration of the fuel cell system. The controller 80 may be implemented with one or more controllers. The controller 80 may obtain information or signals relating to the fuel cell system from the components of the fuel cell system.

The controller 80 may include a processor and memory. The memory may store program commands. The processor may execute the program commands to perform the processes that will be described below. Alternatively, the controller 80 may be integrated with a controller included in another device of the vehicle other than the fuel cell system.

The controller 80 may be implemented as a non-volatile, non-transitory computer readable medium including executable program commands Examples of the computer readable medium may include optical data storage devices such as a read-only memory (ROM), a random access memory (RAM), a compact disk (CD)-ROM, a magnetic tape, a floppy disk, a flash drive, and a smart card. However, the computer readable medium is not limited thereto.

The controller 80 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

Figure 3:
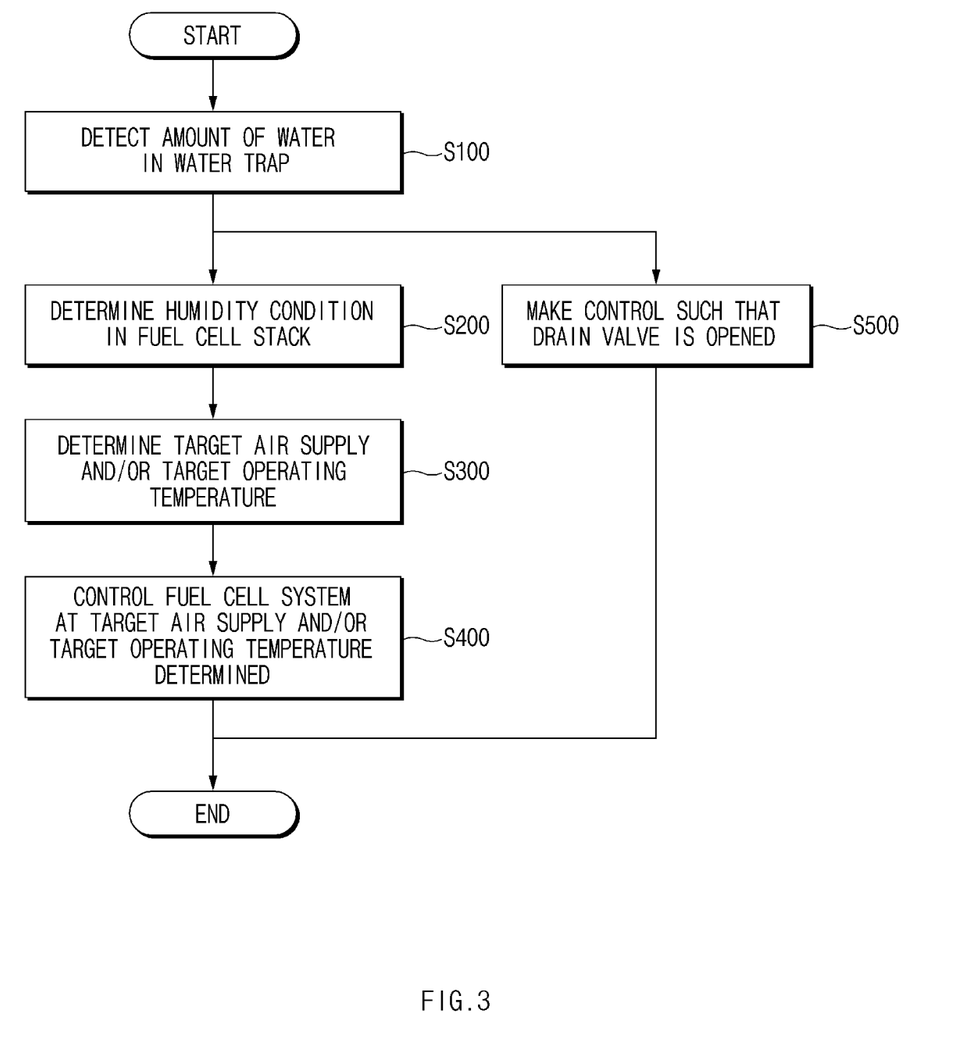
FIG. 3 is a flowchart illustrating a method for determining the humidity condition in the fuel cell system according to an embodiment of the present disclosure.
Figure 4:
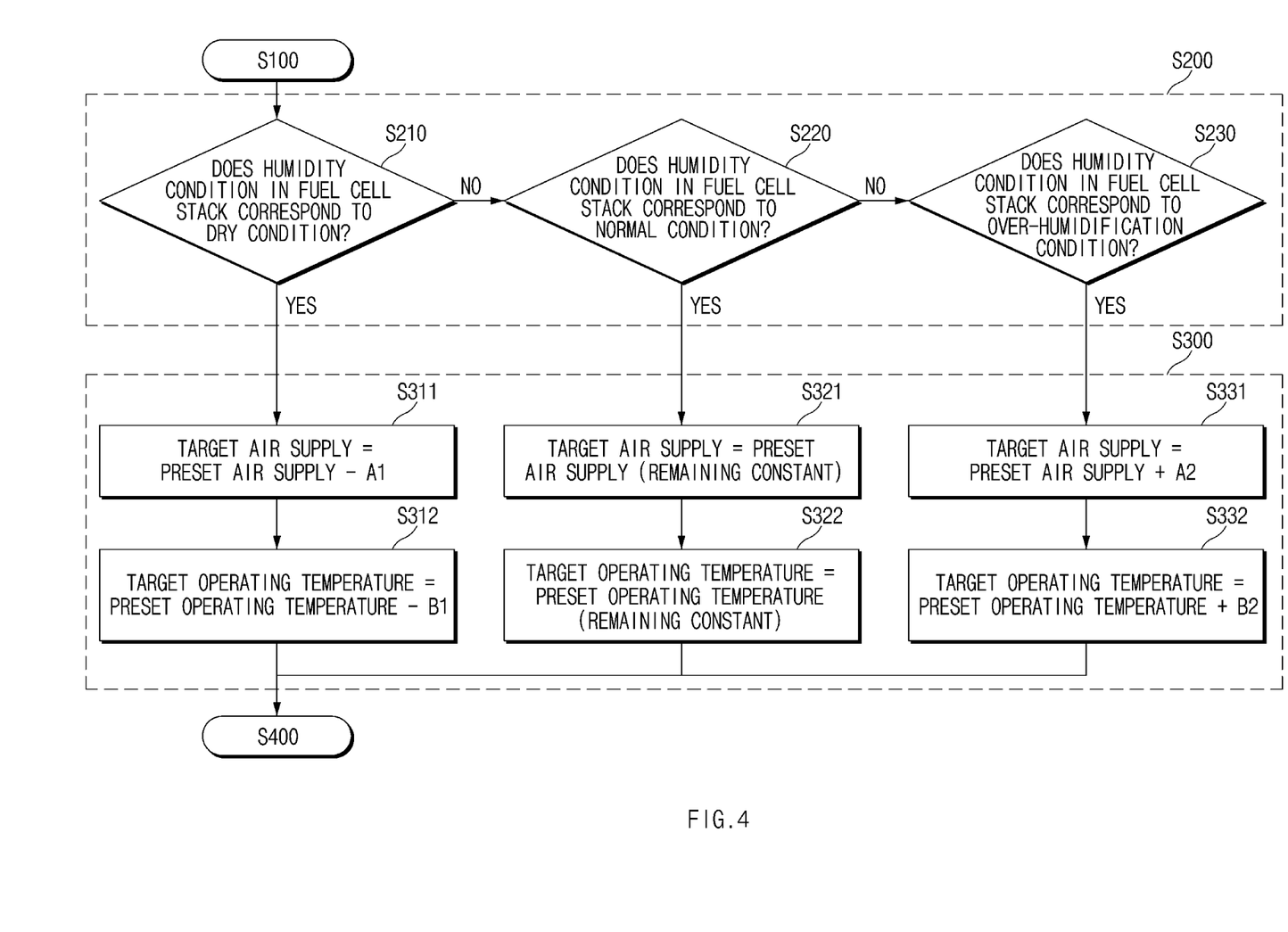
FIG. 4 is a flowchart illustrating steps S200 and S300 of FIG. 3.

FIG. 3 is a flowchart illustrating a method for determining the humidity condition in the fuel cell system according to an embodiment of the present disclosure, and FIG. 4 is a flowchart illustrating steps S200 and S300 of FIG. 3.

Hereinafter, the method for determining the humidity condition in the fuel cell system according to the embodiment of the present disclosure will be described in detail.

The controller 80 may control an overall operation of the fuel cell system to allow the fuel cell system to operate at a default target air supply A and a default target operating temperature B.

The water level sensor may detect the amount of water in the water trap 60 (step S100). The water level sensor may provide a signal to the controller 80, based on the amount of water detected.

The controller 80 may receive the signal relating to the amount of water in the water trap 60 from the water level sensor. The controller 80 may be programmed to periodically receive the signal relating to the amount of water from the water level sensor.

For example, the water level sensor may provide the signal to the controller when the water in the water trap 60 reaches a predetermined water level. Here, the expression "provide the signal" may mean substantially providing the signal by providing an offset signal before a predetermined condition is satisfied and stopping providing the signal when the predetermined condition is satisfied, as well as not providing the signal until the predetermined condition is satisfied.

The controller 80 may determine the humidity condition in the fuel cell stack 10, based on the amount of water detected (step S200). The controller 80 may determine the humidity condition in the fuel cell stack 10, based on the signal received from the water level sensor.

for discharging water in the fuel cell stack 10 by temporarily increasing the flow rate of hydrogen supplied into the fuel cell stack 10.

When it is detected that the amount of water in the water trap 60 immediately after the purging ranges from 10 g to 40 g, the controller 80 may determine that the humidity condition in the fuel cell stack 10 corresponds to a normal condition (step S220).

When it is detected that the amount of water in the water trap 60 immediately after the purging exceeds 40 g, the controller 80 may determine that the humidity condition in the fuel cell stack 10 corresponds to an over-humidification condition (step S230).

When it is detected that the amount of water in the water trap 60 immediately after the purging is less than 10 g, the controller 80 may not determine the humidity condition in the fuel cell stack 10. That is because the information is

TABLE 1

| Determination of Humidity Condition | Amount of Water in Water Trap | Amount of Water in Water Trap immediately after Purging | Increase in Amount of Water in Water Trap after Purging | Rate of Increase in Amount of Water in Water Trap | Drain Valve Opening Period |
|---|---|---|---|---|---|
| Dry Condition | — | — | — | 5 g/min or less | 100,000 C/Cycle or more |
| Normal Condition | 7-25 g | 10-40 g | 3-15 g | 5-20 g/min | 5,000-100,000 C/Cycle |
| Over-humidification Condition | 25 g or more | 40 g or more | 15 g or more | 20 g/min or more | Less than 5,000 C/Cycle |

The controller 80 may determine whether the humidity condition in the fuel cell stack 10 corresponds to a dry condition, a normal condition, or an over-humidification condition, based on pre-stored information in the memory and the amount of water detected (steps S210, S220, and S230).

For example, the controller 80 may determine the humidity condition in the fuel cell stack 10, based on the amount of water in the water trap 60.

When it is detected that the amount of water in the water trap 60 ranges from 7 g to 25 g, the controller 80 may determine that the humidity condition in the fuel cell stack 10 corresponds to a normal condition (step S220).

When it is detected that the amount of water in the water trap 60 exceeds 25 g, the controller 80 may determine that the humidity condition in the fuel cell stack 10 corresponds to an over-humidification condition (step S230).

When it is detected that the amount of water in the water trap 60 is less than 7 g, the controller 80 may not determine the humidity condition in the fuel cell stack 10. That is because the information is insufficient to determine the humidity condition in the fuel cell stack 10. In this case, the controller 80 may skip step S210 of determining whether the humidity condition in the fuel cell stack 10 corresponds to a dry condition and may proceed to step S220 of determining whether the humidity condition in the fuel cell stack 10 corresponds to a normal condition or step S230 of determining whether the humidity condition in the fuel cell stack 10 corresponds to an over-humidification condition.

In another example, the controller 80 may determine the humidity condition in the fuel cell stack 10, based on the amount of water in the water trap 60 immediately after purging. Here, the purging may refer to hydrogen purging insufficient to determine the humidity condition in the fuel cell stack 10. In this case, the controller 80 may skip step S210 of determining whether the humidity condition in the fuel cell stack 10 corresponds to a dry condition and may proceed to step S220 of determining whether the humidity condition in the fuel cell stack 10 corresponds to a normal condition or step S230 of determining whether the humidity condition in the fuel cell stack 10 corresponds to an over-humidification condition.

In another example, the controller 80 may determine the humidity condition in the fuel cell stack 10, based on an increase in the amount of water in the water trap 60 after purging.

The controller 80 may detect the amounts of water in the water trap 60 before and after the purging. The controller 80 may determine the increase in the amount of water in the water trap 60 after the purging with respect to the amount of water in the water trap 60 before the purging. The controller 80 may determine the humidity condition in the fuel cell stack 10, based on the determined increase in the amount of water.

Alternatively, the water level sensor may directly detect the increase in the amount of water after the purging, or a separate processor may receive data on the amounts of water from the water level sensor and may calculate the increase in the amount of water. In this case, the controller 80 may obtain the increase in the amount of water from the water level sensor or the separate processor.

When it is determined that the increase in the amount of water after the purging ranges from 3 g to 15 g, the controller 80 may determine that the humidity condition in the fuel cell stack 10 corresponds to a normal condition (step S220).

When it is determined that the increase in the amount of water after the purging exceeds 15 g, the controller 80 may determine that the humidity condition in the fuel cell stack 10 corresponds to an over-humidification condition (step S230).

When it is determined that the increase in the amount of water after the purging is less than 3 g, the controller 80 may not determine the humidity condition in the fuel cell stack 10. That is because the information is insufficient to determine the humidity condition in the fuel cell stack 10. In this case, the controller 80 may skip step S210 of determining whether the humidity condition in the fuel cell stack 10 corresponds to a dry condition and may proceed to step S220 of determining whether the humidity condition in the fuel cell stack 10 corresponds to a normal condition or step S230 of determining whether the humidity condition in the fuel cell stack 10 corresponds to an over-humidification condition.

In another example, the controller 80 may determine the humidity condition in the fuel cell stack 10, based on the rate of increase in the amount of water in the water trap 60 for a preset period of time.

The controller 80 may receive data on the amount of water from the water level sensor every preset time interval for the preset period of time. The controller 80 may calculate the rate of increase in the amount of water in the water trap 60 for the preset period of time, based on the data received from the water level sensor. The controller 80 may determine the humidity condition in the fuel cell stack 10, based on the calculated rate of increase in the amount of water.

When it is determined that the calculated rate of increase in the amount of water is less than 5 g/min, the controller 80 may determine that the humidity condition in the fuel cell stack 10 corresponds to a dry condition (step S210).

When it is determined that the calculated rate of increase in the amount of water ranges from 5 g/min to 20 g/min, the controller 80 may determine that the humidity condition in the fuel cell stack 10 corresponds to a normal condition (step S220).

When it is determined that the calculated rate of increase in the amount of water exceeds 20 g/min, the controller 80 may determine that the humidity condition in the fuel cell stack 10 corresponds to an over-humidification condition (step S230).

The controller 80 may calculate the rate of increase in the amount of water by using all the amounts of water detected for the preset period of time except the minimum value and the maximum value. The controller 80 may calculate the rate of increase in the amount of water by using the remaining values other than the top and bottom predetermined percent of the amounts of water detected for the preset period of time. Accordingly, the controller 80 may exclude values inappropriate for calculating the rate of increase in the amount of water for the preset period of time and may calculate the rate of increase in the amount of water that more accurately reflects the actual humidity condition in the fuel cell system.

In another example, the controller 80 may determine the humidity condition in the fuel cell stack 10, based on data on a drain valve opening period.

The data on the drain valve opening period may be defined as including the period in which a control signal is generated or provided to open the drain valve 70, the period in which the amount of water in the water trap 60 reaches the amount of water on the basis of which the drain valve 70 is opened, and the like. That is, the data on the drain valve opening period may be defined as including the period in which a predetermined condition for opening the drain valve 70 is satisfied and the period in which a control signal for opening the drain valve 70 is generated, as well as the actual drain valve opening period.

For example, the data on the drain valve opening period may include data on how many times the water in the water trap 60 reaches a predetermined water level, on the basis of which the drain valve 70 is opened, for a preset period of time.

The unit for the drain valve opening period may be defined as the cumulative quantity of electric charge (coulomb (C)) produced in the fuel cell system from previous drain valve opening time to next drain valve opening time. That is, the unit for the drain valve opening period may be coulomb (C) per cycle.

In this case, the fuel cell system may further include a detection device (not illustrated) that detects the cumulative quantity of electric charge produced in the fuel cell system. The controller 80 may receive, from the detection device, data on the cumulative quantity of electric charge produced in the fuel cell system.

When it is determined that the drain valve opening period exceeds 100,000 C/cycle, the controller 80 may determine that the humidity condition in the fuel cell stack 10 corresponds to a dry condition (step S210).

When it is determined that the drain valve opening period ranges from 5,000 C/cycle to 100,000 C/cycle, the controller 80 may determine that the humidity condition in the fuel cell stack 10 corresponds to a normal condition (step S220).

When it is determined that the drain valve opening period is less than 5,000 C/cycle, the controller 80 may determine that the humidity condition in the fuel cell stack 10 corresponds to an over-humidification condition (step S230).

The controller 80 may determine at least one of a target air supply and a target operating temperature, based on the determination result on the humidity condition in the fuel cell stack 10 (step S300). The target air supply may be defined as a target value of an air supply into the fuel cell stack 10. The target operating temperature may be defined as a target value of the inner temperature of the fuel cell stack 10 in operation.

The controller 80 may determine the target air supply, further based on a preset variable air supply range. The variable air supply range may be defined as a range between the minimum value and the maximum value of the air supply required to maintain the performance of the fuel cell system. The humidity in the fuel cell stack 10 needs to be maintained within a predetermined range to maintain the performance of the fuel cell stack 10 at a predetermined level or higher. To achieve this, it is preferable that the air supply into the fuel cell stack 10 be maintained within a predetermined range.

The variable air supply range may be varied depending on an operating environment of the fuel cell stack 10, and variable air supply ranges depending on specific operating environments may be obtained by simulations or experiments and stored in the controller 80.

When it is determined in step S200 that the humidity condition in the fuel cell stack 10 corresponds to a dry condition, the controller 80 may obtain the target air supply by subtracting a decrease A1 from a preset air supply (step S311). Here, the decrease A1 may be obtained by performing a simulation or an experiment on the fuel cell system and may be stored in the memory.

When an ideal air supply calculated based on the output of the fuel cell stack 10 is taken to be 1, the preset air supply may be set to about 1.8 to about 2 times the stoichiometric ratio (SR). Therefore, the preset air supply may be differently set depending on the output of the fuel cell stack 10.

For example, when the ideal air supply is taken to be 1, the decrease A1 may be determined to be a value corresponding to 0.05 times the ideal air supply. That is, the controller 80 may calculate the target air supply as 1.805 SR, for example, when air is currently supplied into the fuel cell stack 10 at 1.8 SR and it is determined that the humidity condition in the fuel cell stack 10 corresponds to a dry condition.

The controller 80 may calculate the target air supply that falls within the preset variable air supply range. That is, when the value obtained by subtracting the decrease A1 from the preset air supply is less than the minimum value of the variable air supply range, the controller 80 may determine the minimum value of the variable air supply range to be the target air supply.

When it is determined in step S200 that the humidity condition in the fuel cell stack 10 corresponds to a dry condition, the controller 80 may obtain the target operating temperature by subtracting a decrease B1 from a preset operating temperature (step S312). Here, the decrease B1 may be obtained by performing a simulation or an experiment on the fuel cell system and may be stored in the memory. For example, the decrease B1 may be set to about 2° C. 2° C. may be experimentally obtained and may be a temperature change required to substantially change the humidity in the fuel cell stack 10. The decrease B1 may be set to about 2° C. in view of the error range of a temperature sensor that detects the operating temperature of the fuel cell stack 10.

When it is determined in step S200 that the humidity condition in the fuel cell stack 10 corresponds to a normal condition, the controller 80 may determine the preset air supply to be the target air supply (step S321). That is, when it is determined that the humidity condition in the fuel cell stack 10 corresponds to a normal condition, the controller 80 may maintain the preset air supply.

When it is determined in step S200 that the humidity condition in the fuel cell stack 10 corresponds to a normal condition, the controller 80 may determine the preset operating temperature to be the target operating temperature (step S322). That is, when it is determined that the humidity condition in the fuel cell stack 10 corresponds to a normal condition, the controller 80 may maintain the preset operating temperature.

When it is determined in step S200 that the humidity condition in the fuel cell stack 10 corresponds to an over-humidification condition, the controller 80 may obtain the target air supply by adding an increase A2 to the preset air supply (step S331). Here, the increase A2 may be obtained by performing a simulation or an experiment on the fuel cell system and may be stored in the memory.

For example, when the ideal air supply is taken to be 1, the increase A2 may be determined to be a value corresponding to 0.05 times the ideal air supply. That is, the controller 80 may calculate the target air supply as 1.795 SR, for example, when air is currently supplied into the fuel cell stack 10 at 1.8 SR and it is determined that the humidity condition in the fuel cell stack 10 corresponds to an over-humidification condition.

When it is determined in step S200 that the humidity condition in the fuel cell stack 10 corresponds to an over-humidification condition, the controller 80 may obtain the target operating temperature by adding an increase B2 to the preset operating temperature (step S332). Here, the increase B2 may be obtained by performing a simulation or an experiment on the fuel cell system and may be stored in the memory.

For example, the increase B2 may be set to about 2° C. 2° C. may be experimentally obtained and may be a temperature change required to substantially change the humidity in the fuel cell stack 10. The increase B2 may be set to about 2° C. in view of the error range of the temperature sensor that detects the operating temperature of the fuel cell stack 10.

The controller 80 may control the fuel cell system at the target air supply or the target operating temperature determined in step S300 (step S400).

For example, the controller 80 may provide a control signal to one or more of the air supply device 20, the humidifier 30, and the air distributor 40 to allow the target air supply to be introduced into the fuel cell stack 10.

For example, the controller 80 may provide a control signal to one or more of the air supply device 20, the humidifier 30, the air distributor 40, the hydrogen supply device 50, and the water trap 60 to allow the fuel cell stack 10 to operate at the target operating temperature.

The controller 80 may make a control such that the drain valve 70 is opened, based on the amount of water detected (step S500). When it is detected that the water in the water trap 60 reaches a predetermined water level, the controller 80 may provide a control signal to the drain valve 70 to open the drain valve 70.

The controller 80 may repeatedly perform steps S100 to S500. That is, the method for determining the humidity condition may further include re-detecting the amount of water in the water trap 60, and re-determining the humidity condition in the fuel cell stack 10, based on the amount of water detected.

In this case, the description of step S100 of detecting the amount of water in the water trap 60 may be applied to the step of re-detecting the amount of water in the water trap 60.

Further, the description of step S200 of determining the humidity condition in the fuel cell stack 10 may be applied to the step of re-determining the humidity condition in the fuel cell stack 10. However, the determination result on the humidity condition previously determined in step S200 may be maintained for a predetermined period of time.

For example, when it is determined in step S200 that the humidity condition in the fuel cell stack 10 corresponds to a normal condition, the controller 80 may maintain the determination of the normal condition for holding time (e.g., 10 minutes) and may then determine the humidity condition in the fuel cell stack 10 to be a dry condition or an over-humidification condition, based on the amount of water detected again.

When it is determined in step S200 that the humidity condition in the fuel cell stack 10 corresponds to a normal condition, the controller 80 may not re-determine the humidity condition in the fuel cell stack 10 for the holding time (e.g., 10 minutes). Alternatively, even though a calculation result based on the amount of water detected for the holding time shows that a condition corresponding to a dry or over-humidification condition is satisfied, the controller 80 may not determine the humidity condition in the fuel cell stack 10 to be a dry or over-humidification condition until the holding time elapses.

When the humidity condition in the fuel cell stack 10 that is determined based on the amount of water detected again corresponds to a normal condition, the controller 80 may maintain the existing determination result on the humidity condition.

In another example, when it is determined in step S200 that the humidity condition in the fuel cell stack 10 corresponds to a dry or over-humidification condition, the controller 80 may maintain the determination of the dry or over-humidification condition for holding time (e.g., 5 minutes) and may then determine the humidity condition in the fuel cell stack 10 to be a normal condition, based on the amount of water detected again.

When it is determined in step S200 that the humidity condition in the fuel cell stack 10 corresponds to a normal condition, the controller 80 may not re-determine the humidity condition in the fuel cell stack 10 for the holding time (e.g., 5 minutes). Alternatively, even though a calculation result based on the amount of water detected for the holding time shows that a condition corresponding to a normal condition is satisfied, the controller 80 may not determine the humidity condition in the fuel cell stack 10 to be a normal condition until the holding time elapses.

When the humidity condition in the fuel cell stack 10 that is determined based on the amount of water detected again corresponds to the previously determined humidity condition, the controller 80 may maintain the determination result on the previous humidity condition.

Accordingly, the air supply and the operating temperature may not be continually varied by a temporal humidity condition change, and the fuel cell system may operate at the target air supply and the target operating temperature while maintaining a determination result for a predetermined period of time, thereby effectively adjusting the humidity condition thereof. While the vehicle is being driven, the output power of the fuel cell system may be varied, and therefore the amount of water may be temporarily increased or decreased. If the target air supply and the target operating temperature of the fuel cell system are varied every time the amount of water is temporarily increased or decreased, the fuel cell system may be overloaded to consume an excess amount of power, and the humidity condition in the fuel cell system may not remain constant.

Figure 5:
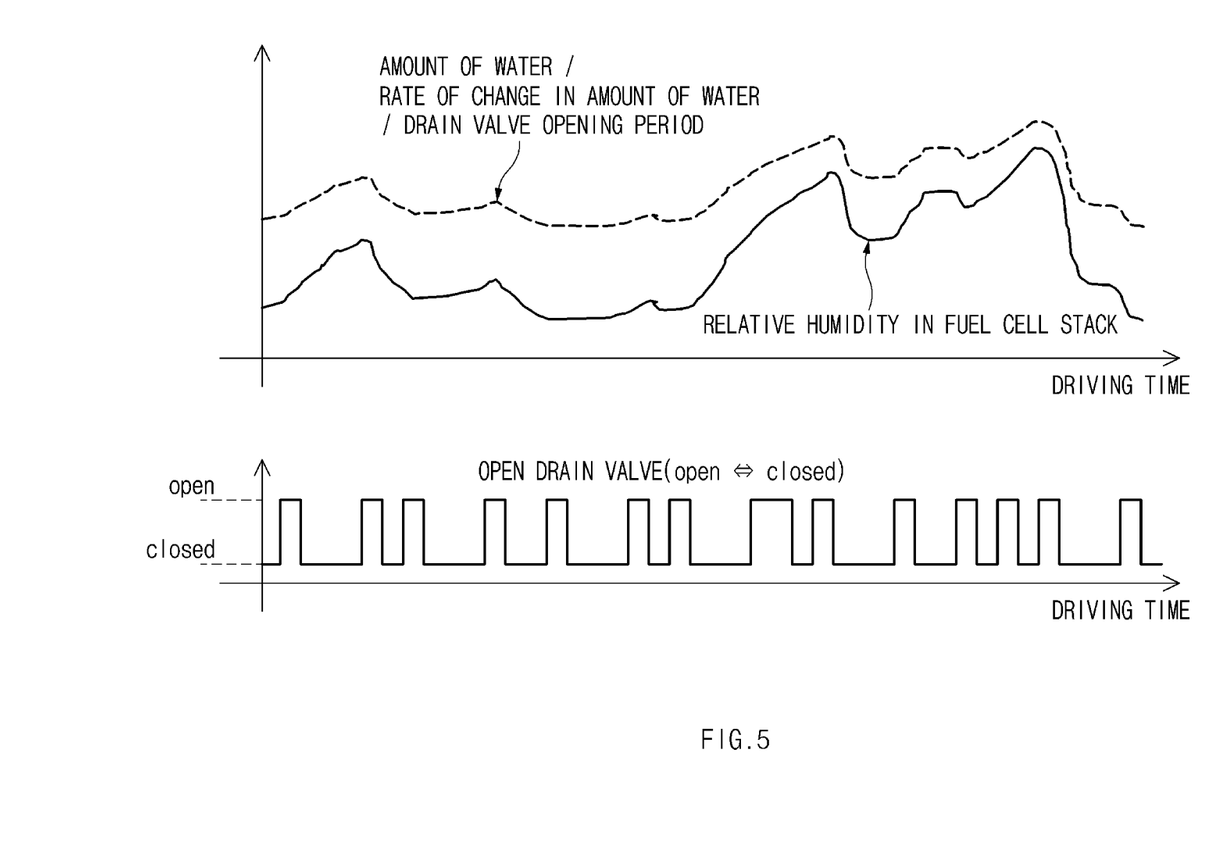
FIGS. 5 and 6 are views for explaining an operation of the fuel cell system according to the embodiment of the present disclosure.
Figure 6:
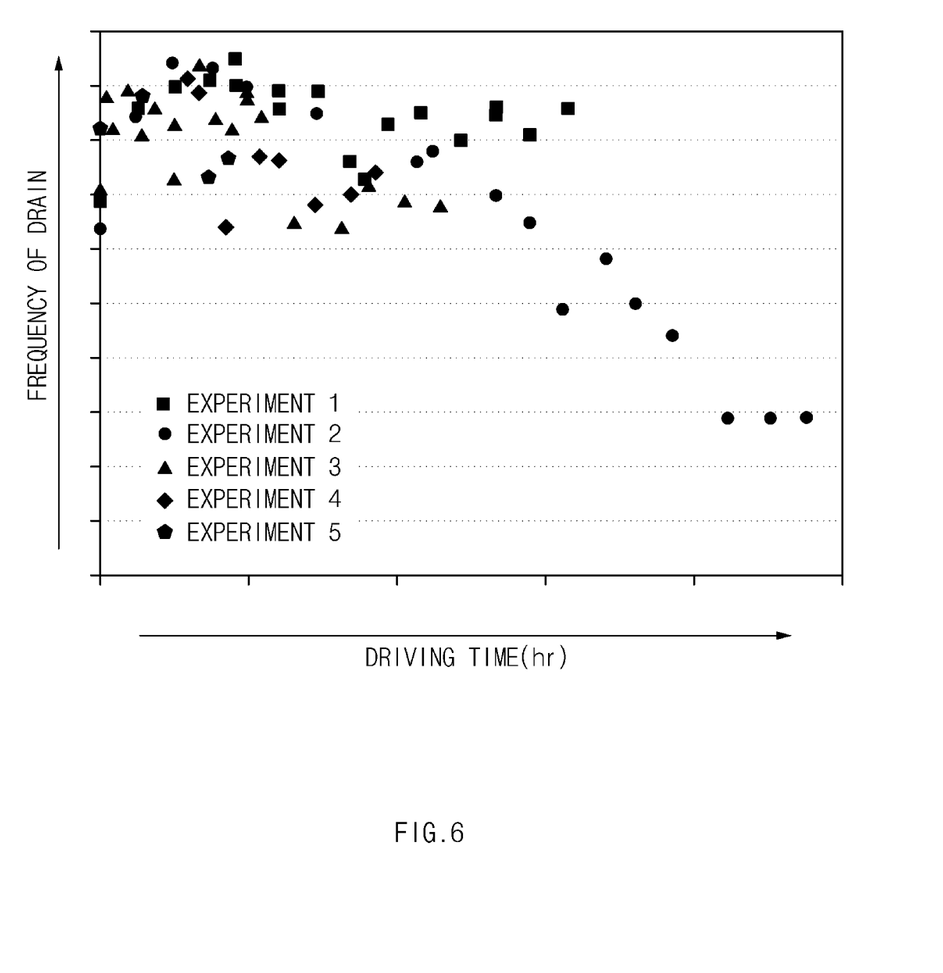

FIGS. 5 and 6 are views for explaining an operation of the fuel cell system according to the embodiment of the present disclosure.

Referring to FIG. 5, the amount of water in the water trap 60 and the change rate thereof, and the drain valve opening period may be similar in variation to the relative humidity in the fuel cell stack 10. In the present disclosure, the actual relative humidity in the fuel cell stack 10 may be more accurately estimated by using the correlation between the amount of water in the water trap 60 and the humidity condition in the fuel cell stack 10.

Referring to FIG. 6, other conditions being equal, the number of times that a drain valve is opened to drain water is gradually decreased with an increase in driving time of a vehicle. This means that the humidification effect of a humidifier is decreased with the increase in the driving time of the vehicle.

When the humidity condition in a fuel cell stack is estimated based on the flow rates of fluids (hydrogen, oxygen, and the like) flowing into and out of the fuel cell stack as in the related art, it may be difficult to reflect the decrease in the humidification effect. Therefore, the humidity condition may be inaccurately estimated.

In the present disclosure, the humidity condition in the fuel cell stack 10 may be determined by using data on the amount of water in the water trap 60 (e.g., the amount of water, the change rate thereof, or the like) that is actually varied according to a humidification effect change, and therefore the decrease in the humidification effect according to the driving time may be reflected. Accordingly, the humidity condition in the fuel cell stack 10 may be more accurately determined by using the humidity condition determination method according to the present disclosure.

In the related art, a fuel cell system must include a separate measurement sensor to measure a flow rate required to estimate the humidity condition in a fuel cell stack. However, in the present disclosure, the water trap 60 and the water level sensor therein (the water level sensor is generally included to detect drain valve opening time) that are generally included in the fuel cell system may be used as they are, and therefore any separate additional component is not required. Accordingly, the fuel cell system may be made simple and compact, and a calculation process and the number of related variables may be minimized, thereby having an advantage of improving reliability of diagnosis. That is because a cumulative error may also increase as the calculation process and the number of variables increase.

The present disclosure described above may be implemented as a computer readable code in a non-transitory computer readable recording medium. The computer readable recording medium may include all types of storage devices for storing data that can be read by a computer system. Examples of the computer readable recording medium may include a hard disk drive (HDD), a solid state disk (SSD), a silicon disk drive (SDD), a ROM, a RAM, a CD-ROM, a magnetic tape, a floppy disk, an optical data storage device, and the like. The computer readable recording medium may be implemented in the form of a carrier wave (e.g., transmission over the Internet).

According to the embodiments of the present disclosure, by directly detecting the amount of water in the container, which receives water discharged from the fuel cell stack, and determining the humidity condition in the fuel cell stack based on the amount of water detected, it is possible to accurately determine the actual humidity condition in the fuel cell stack according to a change in characteristics of the fuel cell system. That is because the amount of water discharged from the fuel cell stack is a result reflecting the change in the characteristics of the fuel cell system, such as degradation in humidification performance.

In addition, according to the embodiments of the present disclosure, the data required to determine humidity is obtained by using the water level sensor in the container, the water level sensor being a device commonly included in the fuel cell system, whereby a separate sensor is not required, thereby having an advantage of making the fuel cell system simple and compact.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for determining a humidity condition in a fuel cell system, the method comprising the steps of:
   (a) detecting, by a water level sensor, an amount of water in a container configured to receive water discharged from a fuel cell stack; and
   (b) determining, by a controller, a humidity condition in the fuel cell stack, based on the amount of water detected,
   wherein the step (a) includes detecting amounts of water in the container before and after purging is performed, or detecting an amount of water in the container immediately after purging is performed, the purging being an operation of inducing discharge of water from the fuel cell stack by temporarily increasing a flow rate of gas supplied into the fuel cell stack.

2. The method of claim 1, wherein the container receives water discharged from an cathode or a anode of the fuel cell stack, and
wherein in the step (a), the amount of water in the container is detected by using the water level sensor installed in the container to detect an amount of water.

3. The method of claim 1,
wherein the step (b) includes determining the humidity condition in the fuel cell stack, based on an increase in the amount of water in the container after the purging with respect to the amount of water in the container before the purging.

4. The method of claim 3, wherein in the step (b), the humidity condition in the fuel cell stack is determined to correspond to a normal condition when the increase in the amount of water ranges from 3 g to 15 g and an over-humidification condition when the increase in the amount of water exceeds 15 g.

5. A method for determining a humidity condition in a fuel cell system, the method comprising the steps of:
(a) detecting, by a water level sensor, an amount of water in a container configured to receive water discharged from a fuel cell stack; and
(b) determining, by a controller, a humidity condition in the fuel cell stack, based on a rate of increase in the amount of water in the container for a preset period of time, or the amount of water in the container.

6. The method of claim 5, wherein in the step (b), the humidity condition in the fuel cell stack is determined to correspond to a normal condition when the rate of increase in the amount of water ranges from 5 g/min to 20 g/min, an over-humidification condition when the rate of increase in the amount of water exceeds 20 g/min, and a dry condition when the rate of increase in the amount of water is less than 5 g/min.

7. The method of claim 5, wherein the step (b) further includes:
calculating the rate of increase in the amount of water by using values of amounts of water detected for the preset period of time except a minimum value and a maximum value; and
determining the humidity condition in the fuel cell stack, based on the calculated rate of increase in the amount of water.

8. A method for determining a humidity condition in a fuel cell system, the method comprising the step of:
(a) detecting, by a water level sensor, an amount of water in a container configured to receive water discharged from a fuel cell stack;
(b) determining, by a controller, a humidity condition in the fuel cell stack, based on the amount of water detected, and
making a control such that a drain valve is opened to discharge water in the container when the amount of water in the container reaches a predetermined value,
wherein the step (b) includes determining the humidity condition in the fuel cell stack, based on data on an opening period of the drain valve.

9. The method of claim 8, wherein in the step (b), the humidity condition in the fuel cell stack is determined to correspond to a normal condition when the opening period of the drain valve ranges from 5,000 C/cycle to 100,000 C/cycle, a dry condition when the opening period of the drain valve exceeds 100,000 C/cycle, and an over-humidification condition when the opening period of the drain valve is less than 5,000 C/cycle, wherein the unit C/cycle for the opening period of the drain valve is defined as a cumulative quantity of electric charge (coulomb, C) produced in the fuel cell system from previous drain valve opening time to next drain valve opening time.

10. The method of claim 5, wherein in the step (b), the humidity condition in the fuel cell stack is determined to correspond to a normal condition when the amount of water in the container ranges from 7 g to 25 g and an over-humidification condition when the amount of water in the container exceeds 25 g.

11. The method of claim 1, wherein the step (b) includes determining the humidity condition in the fuel cell stack, based on an amount of water in the container immediately after the purging.

12. The method of claim 11, wherein in the step (b), the humidity condition in the fuel cell stack is determined to correspond to a normal condition when the amount of water in the container immediately after the ranges from 10 g to 40 g and an over-humidification condition when the amount of water in the container immediately after the purging exceeds 40 g.

13. The method of claim 1, further comprising:
(c) determining at least one of a target air supply and a target operating temperature, based on the humidity condition in the fuel cell stack determined in the step (b).

14. The method of claim 13, further comprising:
(d) controlling the fuel cell system at the target air supply or the target operating temperature determined in the step (c).

15. The method of claim 13, wherein in the step (c), the target air supply is determined further based on a preset variable air supply range relating to minimum and maximum change values in varying an air supply.

16. The method of claim 1, further comprising:
(e) re-detecting an amount of water in the container; and
(f) re-determining a humidity condition in the fuel cell stack, based on the amount of water detected,
wherein the humidity condition in the fuel cell stack determined in the step (b) is maintained for preset holding time and is maintained or changed according to a determination result in the step (f).

* * * * *